Dec. 3, 1968   P. JORGENSEN ET AL   3,414,186
TRANSDUCER
Filed July 22, 1966   6 Sheets—Sheet 1
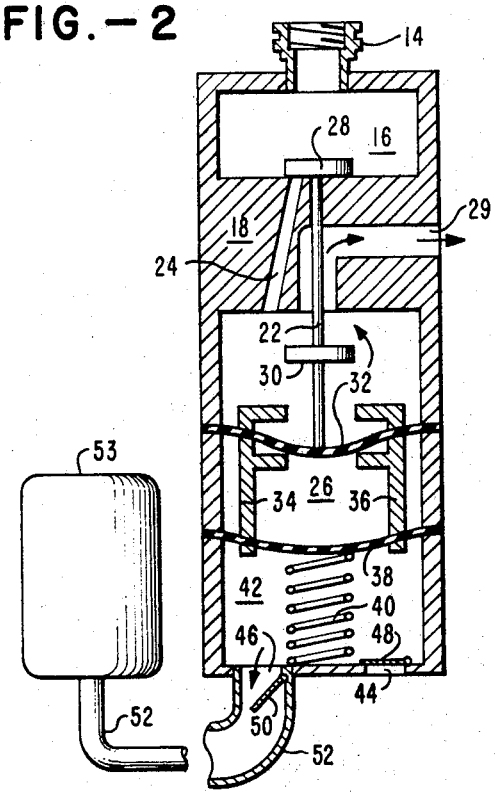
FIG.—2
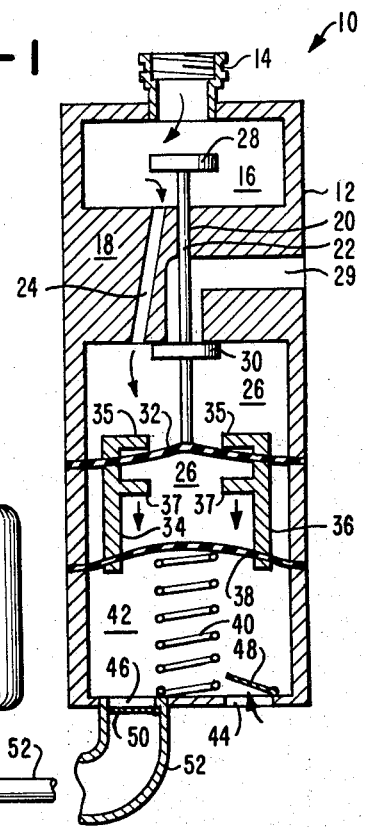
FIG.—1
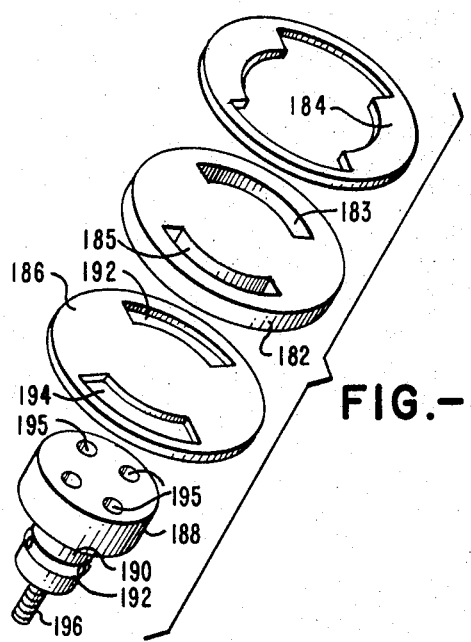
FIG.—8
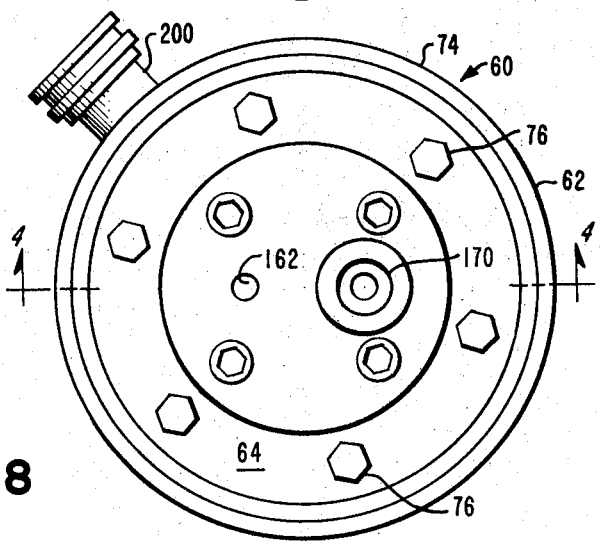
FIG.—3
INVENTORS
THOMAS B. ODOM
POUL JORGENSEN
HARRY L. JACKSON
BY *Julius L. Rubinstein*
ATTORNEY

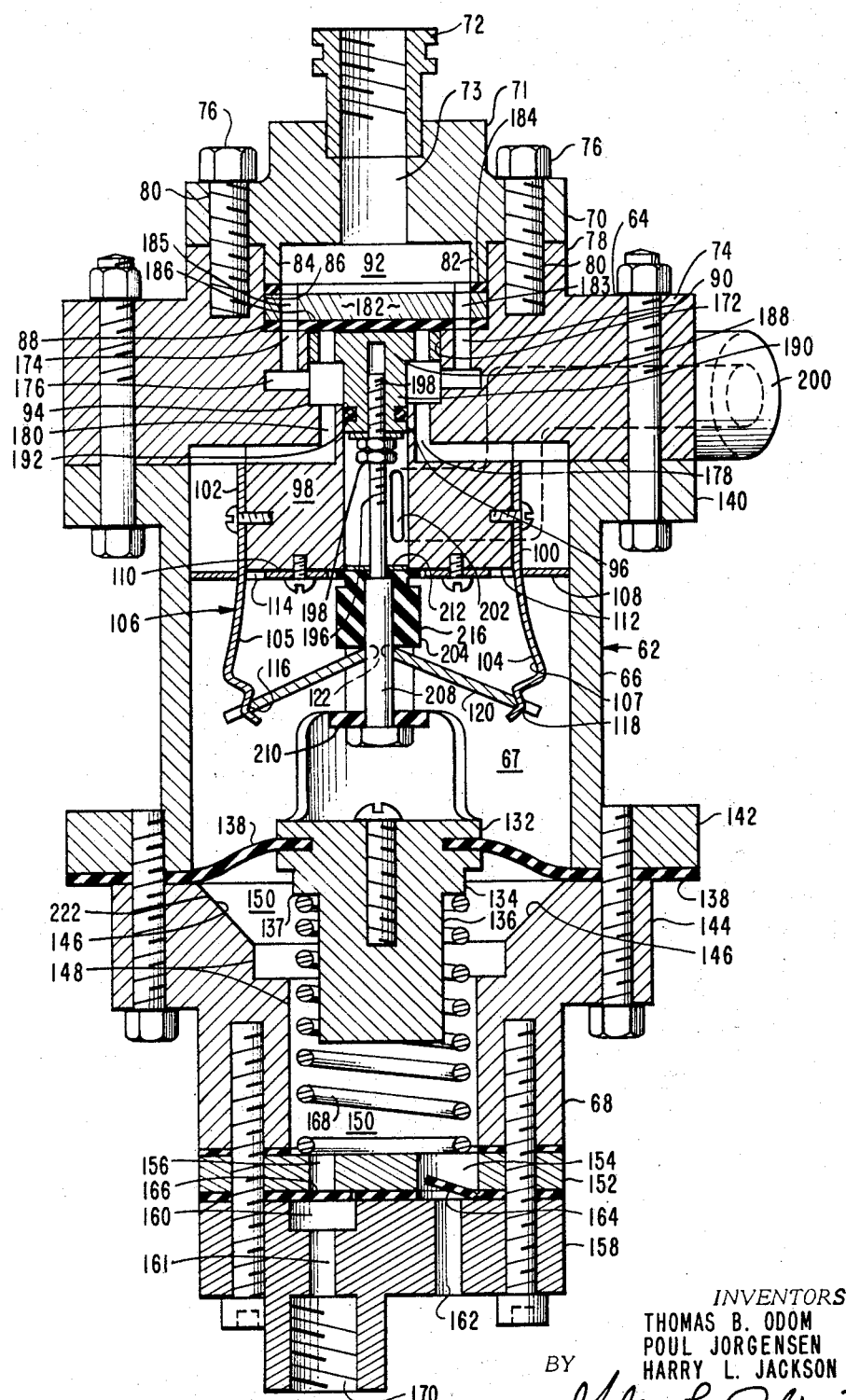
FIG.—4
INVENTORS
THOMAS B. ODOM
POUL JORGENSEN
HARRY L. JACKSON
ATTORNEY Dec. 3, 1968     P. JORGENSEN ET AL     3,414,186

TRANSDUCER

Filed July 22, 1966     6 Sheets-Sheet 3

INVENTORS
THOMAS B. ODOM
POUL JORGENSEN
BY HARRY L. JACKSON

*Julius L. Rubinstein*

ATTORNEY

Dec. 3, 1968   P. JORGENSEN ET AL   3,414,186
TRANSDUCER
Filed July 22, 1966   6 Sheets-Sheet 4

INVENTORS
THOMAS B. ODOM
POUL JORGENSEN
HARRY L. JACKSON
BY
*Julius L. Rubenstein*
ATTORNEY Dec. 3, 1968 P. JORGENSEN ET AL 3,414,186
TRANSDUCER
Filed July 22, 1966 6 Sheets-Sheet 5

INVENTORS
THOMAS B. ODOM
POUL JORGENSEN
BY HARRY L. JACKSON

ATTORNEY

Dec. 3, 1968  P. JORGENSEN ET AL  3,414,186
TRANSDUCER
Filed July 22, 1966  6 Sheets-Sheet 6

INVENTORS
THOMAS B. ODOM
POUL JORGENSEN
HARRY L. JACKSON
BY
Julius L. Rubinstein
ATTORNEY United States Patent Office 3,414,186
Patented Dec. 3, 1968

3,414,186
TRANSDUCER
Poul Jorgensen, 3649 Meadville Drive, Sherman Oaks, Calif. 91403; Harry L. Jackson, 9 Stallion Road, Rolling Hills, Calif. 90274; and Thomas B. Odom, 960 Latchford Ave., Hacienda Heights, Calif. 91745
Filed July 22, 1966, Ser. No. 567,147
22 Claims. (Cl. 230—52)

ABSTRACT OF THE DISCLOSURE

This invention relates to a water pressure powered air pump for rapidly generating air pressure from water pressure. In this invention, water under pressure, as from a water faucet, enters a housing and causes a diaphragm or piston to move back and forth in the housing. The diaphragm or piston separates the water in the housing from an air chamber in the housing and this movement of the diaphragm or piston, when combined with suitable air inlet and outlet valves in the air chamber, first draws air into the chamber and then pushes it out of the air chamber to a pressure tank to provide air pressure.

---

This invention relates generally to a tarnsducer, and more particularly to a device for utilizing water pressure to power an air pump.

Motor powered gas or air compressors are well known in the art, but those heretofore made utilized a conventional mechanical compressor driven by an electric motor, or internal combustion engine. Such machines were rather expensive and were vulnerable to failures in electric power or lack of fuel. In addition, the mechanical parts in prior devices were highly stressed and they had to be designed with sufficient strength to endure the stresses. This was expensive, and despite careful design, the stressed parts were generally prone to breakdown.

Furthermore, prior air or gas compressors could not function safely in certain environments. For example, in some circumstances, electrical power can not safely be used, as when the compressor is operating in an explosive atmosphere. Similarly, in some circumstances, the internal combustion engines used to power prior compressors can not be used either because of the presence of explosive gasses in the atmosphere, or because of special difficulties in eliminating the exhaust gasses, as for example in submarines.

Accordingly, a need exists for an inexpensive gas of liquid pump or compressor which does not require highly stressed parts and which operates by using water under pressure. The presence of water under pressure, which is conveniently present at the faucets or water outlets of almost every home or building suggests that it would be mos practical to provide a pump which is powered by the line pressure of the water as it appears at the faucets or water outlets.

What is needed therefore and comprises one of the important objects of this invention is to provide an inexpensive water pressure powered air compressor.

These and other objects of this invention will become more apparent when better understood in the light of the accompanying drawing and specification wherein:

FIG. 1 is an elevational sectional view of a simplified diagram of the air pump in a water intake position.

FIG. 2 is an elevational view of the device shown in FIG. 1 in a water exhaust position.

FIG. 3 is an end view of the water powered air pump constructed according to the principles of this invention.

FIG. 4 is a sectional view taken on the line 4—4 of FIG. 3 showing the air pump in the water intake position.

FIG. 8 is an exploded perspective view of the sub-assembly removed from FIG. 7.

Figure 6:
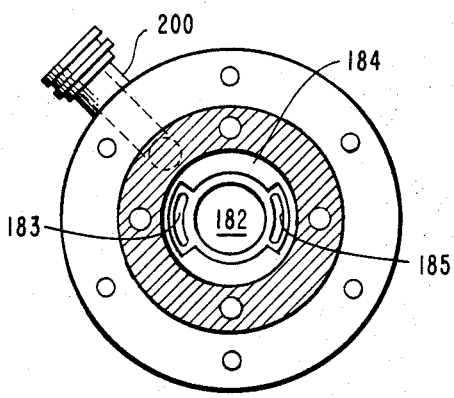
FIG. 6 is a sectional view taken on the line 6—6 of FIG. 5.
Figure 7:
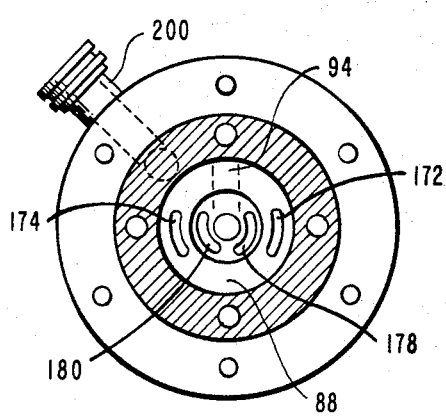
FIG. 7 is a sectional view taken on the line 6—6 of FIG. 5 but with a sub-assembly removed.

Referring now to FIG. 1 of the drawing, a simplified schematic diagram of the transducer or air pump 10 is shown to facilitate understanding of the more complex mechanism constructed in practice and described below. The simplified air pump, and the more complex mechanism described below, operate between a water intake position and a water exhaust position. FIG. 1 shows the air pump in a water intake position and FIG. 2 shows the air pump in a water exhaust position.

The air pump comprises a housing or body 12. The body has a fitting 14 at one end for attachment to a standard water faucet or outlet in a home or building. The fitting 14 communicates with a water inlet chamber 16. The base 18 of chamber 16 is provided with a centrally disposed bore 20 in which a valve stem 22 is slidably mounted. In addition, the base of chamber 16 is provided with an additional bore 24 connecting the water inlet chamber 16 to the water chamber 26. A valve 28 is attached to the end of valve stem 22 and in the position shown the valve 28 is in an open position permitting bore 24 to connect the water inlet chamber 16 with the water chamber 26.

A water outlet passage 29 is formed in the base 18 and connects the water chamber 26 with the outside of the air pump. An additional valve 30 is secured to valve stem 22 for opening and closing off passage 29. It is noted in FIG. 1 that in the water intake position, valve 30 closes off passage 29 while valve 28 opens passage 24. Conversely in the water exhaust position, valve 28 closes off bore 24 while valve 30 opens passage 29 so that valves 28 and 30 may be described as alternate action closures.

Valve stem 22 is also connected to the hinge of a snap action toggle mechanism 32. This snap action toggle mechanism is movable between the two stable positions shown in FIG. 1 and FIG. 2. A diaphragm 38 is provided. This diaphragm divides housing 12 into a water chamber 26 and an air chamber 42. A pair of toggle actuators 34 and 36 are mounted on the diaphragm 38. The toggle actuators are generally F-shaped in the diagram, and have arms 35 and 37 which move with the diaphragm 38. As these toggle actuators move they contact the toggle mechanism 32 and exert forces on it during the operation of the pump.

A coil spring 40 is mounted in the air chamber 42 and biases the diaphragm toward the water chamber 26 for reasons to be described below. The air chamber 42 is provided with an air inlet 44 and an air exhaust 46 and the air inlet and the air exhaust are both controlled by pressure actuated leaf valves 48 and 50. The air exhaust 46 is connected to a conduit 52 leading to an air pressure storage tank 53.

In operation, the fitting 14 is connected to a water faucet in the home or building. With the water faucet valve turned on, water enters the water inlet chamber 16 and runs through the bore 24 to the water chamber 26. As the water chamber 26 fills, the pressure of the water bearing of diaphragm 38 gradually forces the diaphragm toward the air chamber. As this happens the toggle actuators 34 and 36 move in such a way that the arms 35 bear against the snap action toggle mechanism 32 and move the toggle mechanism enough to cause the toggle mechanism 32 to snap from the stable position shown in FIG. 1 to the stable position shown in FIG. 2. When this happens the toggle mechanism pulls the valve stem 22 toward the air chamber so that valve 28 abruptly closes bore or passage 24 while valve 30 abruptly opens passage 29.

When diaphragm 38 moves toward the air chamber it decreases the volume of the air chamber 42 thereby increasing its air pressuse. This increase in air pressure forces inlet valve 48 to a closed position and opens the outlet valve 50 so that air under pressure inside the air chamber 42 is forced out of the air chamber through conduit 52 to the pressure tank 53. Since the pressure in air chamber 42 rises as the diaphragm 38 moves toward the air chamber, the differential pressure across the diaphragm is always balanced except for the force exerted by coil spring 40 on the diaphragm.

As the valve 30 opens passage 29, the force exerted by the coil spring 40 on the diaphragm moves the diaphragm toward the water chamber 26 so that the water in the water chamber 26 is forced out through the exit passage 29. This movement of the diaphragm carries the toggle actuators 34 and 36 with it causing arms 37, which bear against the toggle mechanism 32, to exert enough force on the toggle mechanism to cause it to snap back to the stable position shown in FIG. 1. When this happens the volume of the air chamber 42 increases causing a drop in air pressure. The drop in pressure is sufficient to cause the inlet leaf valve 48 to open and admit more air into the air chamber. At the same time the valve stem 22 moving with the toggle mechanism 32 causes valve 28 to move so bore 24 is open while valve 30 closes off the water exit passage 29. At this time water from the faucet once again can enter chamber 16 and move through passage 24 to repeat the cycle. With this arrangement it is clear that the flow of water into the housing 12 at inlet 14 is periodic and that this periodic flow of water produces a reciprocal movement of the diaphragm. Further, the reciprocal movement of the diaphragm in turn causes valve stem 22 to have a reciprocal movement so that valves 28 and 30 open and close periodically.

If the outlet of the air chamber is open to the ambient air, the pressure in the air chamber 42 would only equal ambient air pressure. Consequently, since diaphragm 38 is balanced, the pressure in the water chamber 26 could only equal the back pressure afforded by the spring. If the outlet of the air chamber is directed to a sealed air tank via conduit 52, then as the pressure in the air tank increases, the pressure in the water chamber would also increase. As stated above the pressure in the water chamber would always exceed the pressure in the air chamber by the force exerted by the coil spring 40. Consequently, the pressure in the water chamber 26 would increase as the pressure in air chamber 42 increases. This would continue until the pressure on the water side of the diaphragm finally rises to the line pressure.

It is of course understood that although the air pump shown is powered by water pressure, the principles of this invention can be practiced using compressed air or any compressed gas or liquid to move and store any liquid or gas, as desired.

The actual transducer or water powered pump constructed according to the principles of this invention and indicated generally by the reference numeral 60 comprises a housing or body 62 generally circular in cross section, see FIG. 3, although it is understood that this shape is not essential to the practice of this invention. The housing 62 in the particular embodiment shown is formed in three main sections which are bolted together, see FIG. 4. These sections are the water intake end section 64, the central section 66 and the gas or air intake end section 68. The water intake end section 64 comprises a water intake end piece 70. End piece 70 is generally circular in cross section, and includes an outwardly projecting centrally disposed boss 71 having an internal bore 73 extending therethrough. A fitting 72 is secured to the boss 71 over bore 73. The fitting 72 may be provided with internal threads sized to fit onto a standard water faucet or outlet in the home or building.

The end piece 70 is secured to the end body member 74 by means of bolts 76, see FIGS. 3 and 4. The end body member 74 includes a first boss 78. The boss is generally circular in cross section and includes threaded circularly disposed bolt receiving bores 80 for receiving the bolts 76 so that the water intake end piece 70 and the end body member 74 may be held together.

Figure 5:
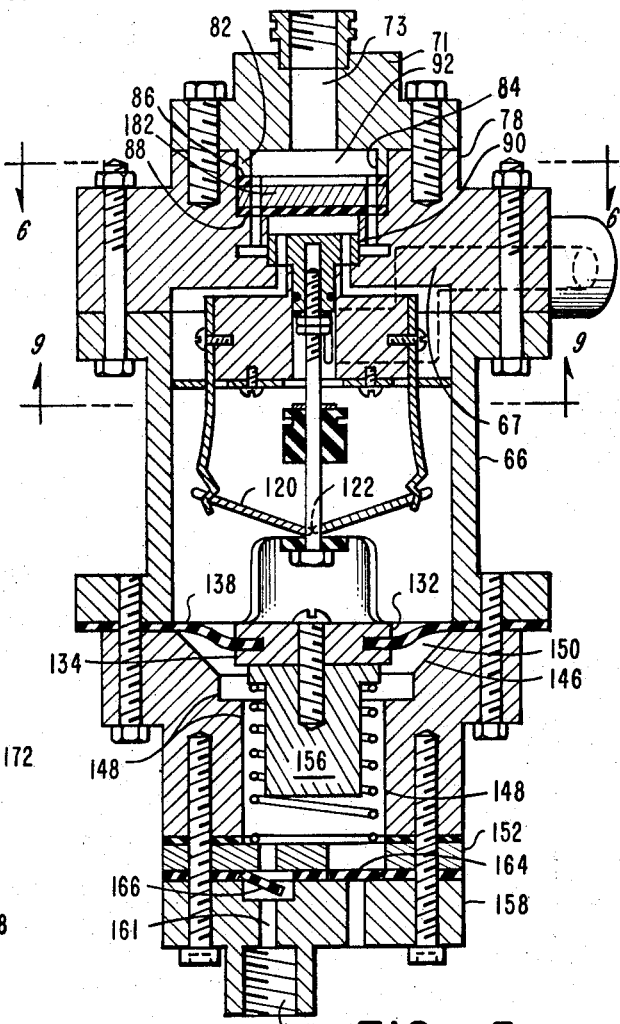
FIG. 5 is a sectional elevational view like that in FIG. 4 but showing the air pump in a water exhaust position.

End piece 70 also includes a boss 82 concentric with boss 71 and extending in the opposite direction with respect thereto, see FIG. 5. Boss 82 is provided with a bore 84, see FIG. 5. As shown bore 84 is substantially larger than bore 73 and serves as part of a water inlet chamber.

Boss 78 is also provided with a concentric bore 86 and when the end piece 70 and the end body member 74 are bolted together, bore 86 will be concentric with bore 84. As shown in the drawing, bore 86 is sized to closely receive boss 82. In addition, the base 88 of bore 86 is provided with a smaller bore 90 for reasons to be described below. As shown in FIGS. 4, 5, 10 and 11 bore 90 is concentric with bore 86. With this arrangement, the bore 84 in boss 82 and bore 86 in boss 78 cooperate to form the complete water inlet chamber 92.

The base 94 of bore 90 is provided with a still smaller concentric bore 96 extending downwardly therethrough, see FIGS. 4, 10, 11, 12 and 13. The end body member 74 is provided with an enlarged boss 98 extending in a direction opposite to boss 78. Boss 98 is provided with a diametrically disposed leaf spring receiving channels 100 and 102, see FIGS. 4, 13 and 15. Leaf springs 104 and 106 are mounted in these channels by means of screws, as shown in the drawings.

Figure 9:
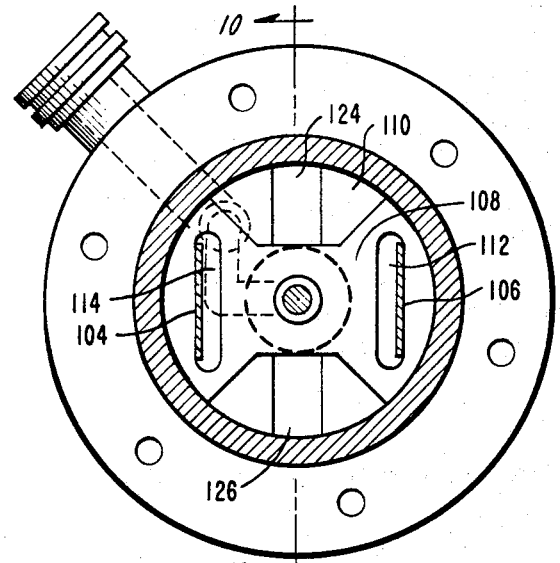
FIG. 9 is a sectional view taken on the line 9—9 of FIG. 5.
Figure 10:
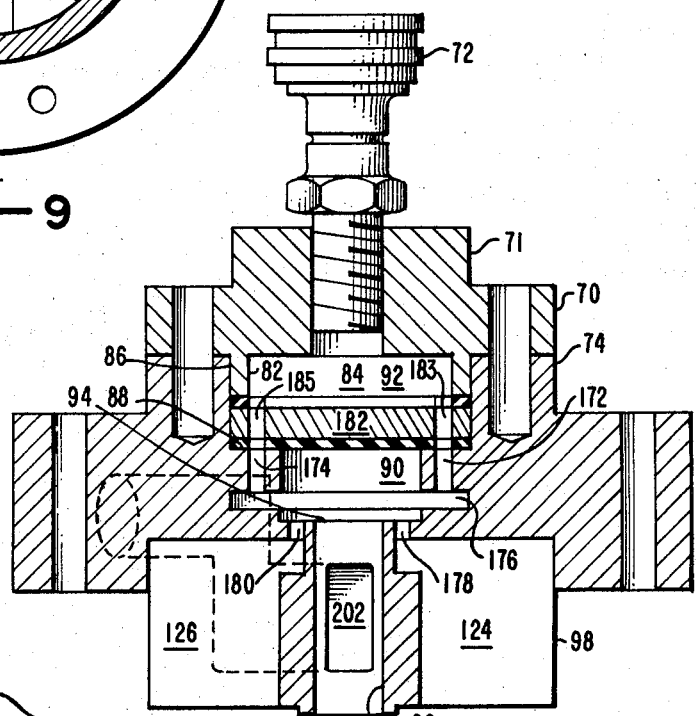
FIG. 10 is a sectional view taken on the line 10—10 of FIG. 9 but with the valve assembly removed.
Figure 11:
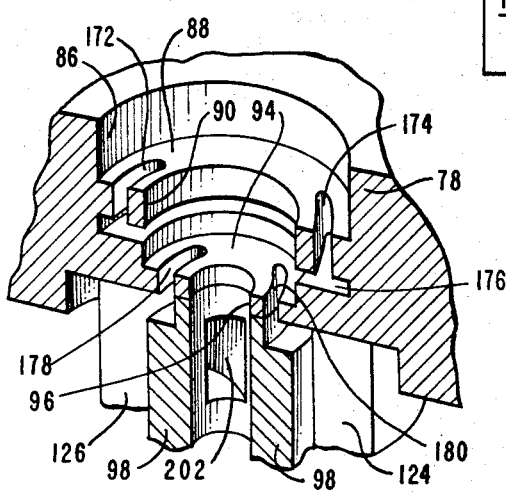
FIG. 11 is an elevational perspective view of the water intake end section of the air pump.
Figure 14:
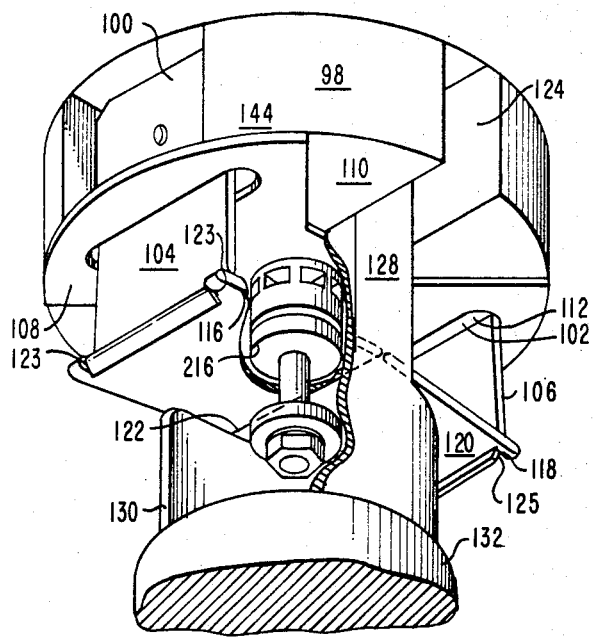
FIG. 14 is a perspective view of the toggle mechanism in the water intake position.
Figure 20:
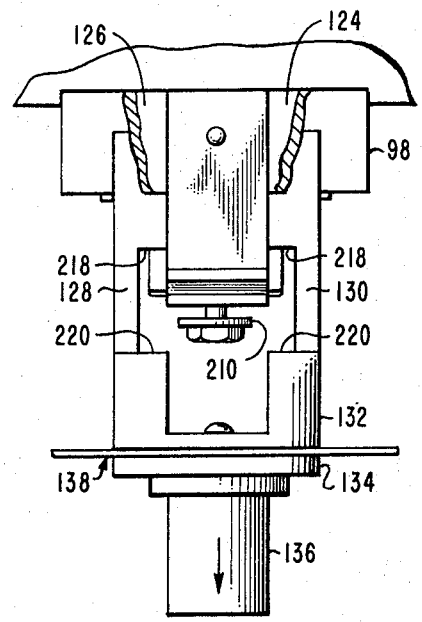
FIG. 20 is an elevational section view of the toggle actuators engaging the toggle mechanism in a water intake position.

A leaf spring back up plate 108 is secured to the base 110 of boss 98 by means of screws, see FIGS. 4, 9 and 14. The back up plate 108 is provided with elongated slots 112 and 114 through which the free portions 105 and 107 of leaf springs 104 and 106 extend, see FIG. 9. With the structure shown in the drawings, the engagement between the edge of slots 112 and 114 and the adjacent part of the leaf springs define the bending moment of the springs.

Figure 15:
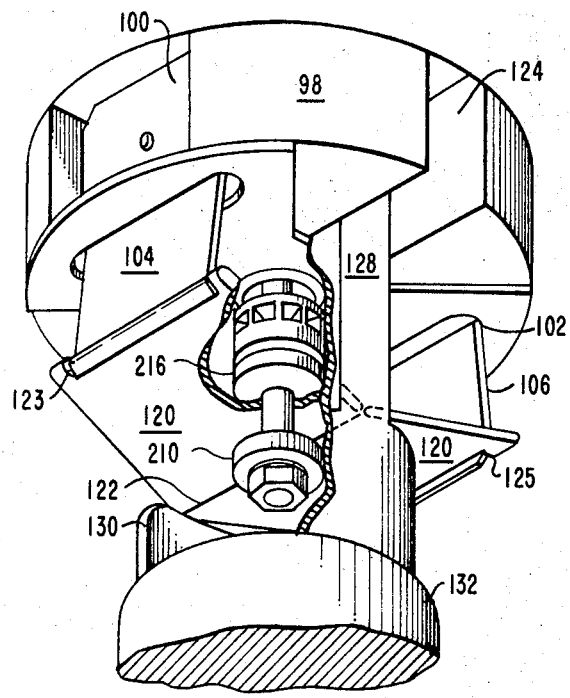
FIG. 15 is a perspective view of the toggle mechanism in the water exhaust position.

The extreme ends of the free portions 105 and 107 of the leaf springs are provided with facing grooves 116 and 118 for receiving the edges of the spring loaded snap action toggle mechanism 120, see FIGS. 4, 14, and 15. This mechanism connects valves 188 and 204 to diaphragm 138 as will become apparent below.

The snap action toggle mechanism 120, in the particular embodiment shown comprises a piece of rigid material, preferably polypropylene sheet, and is plate-like and generally rectangular in shape and grooved at the midline 122 to form a hinge. The opposed edges of the toggle are provided with U-shaped recesses 123 and 125 for engaging grooves 116 and 118 and embracing the edges of the leaf spring, see FIGS. 14 and 15. In this way the opposed edges of the toggle mechanism are retained in grooves 116 and 118 of the leaf springs to provide the desired snap action.

Boss 98 is also provided with oppositely disposed guide channels 124 and 126, extending inwardly from the opposite sides of the periphery of the boss, see FIGS. 9 and 14. The guide channels are sized to guidingly receive toggle actuators 128 and 130, see FIGS. 14, 15, 19, 20 and 21.

The toggle actuators 128 and 130 in the particular embodiment shown are joined at one end to a common base 132 which happens to be circular in cross section, although this is not essential, see FIGS. 4, 15, 19, 20 and 21. The base 132 is secured to section 134 by means of a screw, as shown in the drawings. Section 134 is provided with a downwardly projecting shouldered spring receiving boss 136, see FIG. 4. A flexible pressure responsive diaphragm 138 formed from a suitable rubber like material is clamped between base 132 and section 134, see FIGS. 4, 19, 20 and 21.

As shown in FIGS. 4 and 5, the central section 66 of the housing 62 is generally cylindrical in shape and is tubular providing thereby a power fluid or water chamber 67. This central section 66 is provided with circular end flanges 140 and 142. End flange 140 is secured to the end body member 74 by means of bolts and nuts as shown. Similarly, end flange 142 is bolted onto one end of gas intake end section 68. It is noted however that the gas intake end section is provided with an enlarged flange 144 at one end which bears against end flange 142. With this arrangement the periphery of the diaphragm 138 may be clamped and held between these abutting flanges. With this arrangement the diaphragm 138 divides housing 62 into chambers 67 and 150. Chamber 67 is for receiving water under pressure, or if water is not used to power the pump this one chamber receives any other power fluid under pressure and hence may be referred to as a power fluid chamber. The air chamber 150 is on the opposite side of the diaphragm. However, since the pump can be used to compress or move air or any other working fluid, chamber 150 may be referred to as a work fluid chamber.

An enlarged conical diaphragm receiving depression 146 is formed in the enlarged flange 144 and is concentric therewith. This depression 146 terminates in and is concentric with a stepped cylindrical bore 148 extending through the gas intake end section 68 and defining the said air or work fluid chamber 150.

The stepped bore 148 in the end section 68 is in this particular embodiment closed off by a circular support member 152, see FIGS. 4 and 5. The support member 152 is provided with two parallel bores 154 and 156 extending therethrough as seen in FIG. 4, bore 154 is larger than bore 156, for reasons to become apparent below.

A gas intake end piece 158 is provided. This end piece is also provided with parallel bores 160 and 162 extending therethrough and spaced similarly to bores 154 and 156. Bore 160 is larger than bore 162 for reasons to become apparent below. As seen in FIG. 4, the abutting ends of the gas intake end section 68 support member 152 and the end piece 158 are all circular in cross section, and in the embodiment shown have the same diameter. These parts are all secured together by means of suitable bolts, as shown in the drawing.

When these parts are bolted together, bores 160 and 156 are concentric and communicate with each other. Similarly bores 154 and 162 are concentric and communicate with each other. It is noted that these concentric bores also communicate with the air of work fluid chamber 150.

Pressure actuated leaf valves 164 and 166 are mounted on support member 152 between the facing surfaces of support member 152 and end piece 158. Leaf valve 164 is mounted so it pivots inwardly into bore 154, as shown in the drawing and serves as the air or work fluid intake valve. Leaf valve 166 is mounted so it pivots outwardly into bore 160, see FIGS. 4 and 5, serving thereby as an outlet valve. Bore 160 is stepped down in size at 161 to communicate with a threaded bore 170 which serves to receive a fitting for connecting the chamber 150 to a pressure storage tank.

A coil spring 168 embracing the spring receiving boss 136 bears against the shoulder 137 of boss 136 and support member 152 to bias the diaphragm 138 and the toggle actuators 128 and 130 toward the water or power fluid chamber 67.

The base 88 of bore 86 in the water inlet chamber 92 is provided with arcuate slots 172 and 174 formed thereon on opposite sides of bore 90, see FIGS. 4, 7, 10 and 11. These slots communicate with a circular saturn-like groove 176 formed in the end body member 64. Groove 176 is concentric with and communicating with bore 90. The base 94 of bore 90 is also provided with arcuate slots 178 and 180 which communicate with the guide channels 124 and 126 leading to the water or power fluid chamber 67 in the central section 66, see FIGS. 10 and 11. In this way, water or power fluid communication is provided from the inlet fitting 72 through the inlet chamber 92, then through slots 172 and 174 to groove 176, and then through slots 178 and 180, and then finally through the guide channels 124 and 126 to the chamber 67.

For reasons to be explained below, a disk shaped deflecting plate 182 covered with rubber gaskets 184 and 186 on opposite sides thereof is mounted in chamber 92 on base 88, see FIGS. 4, 6, 8 and 10, although it is understood that this structural detail is not essential to the practice of the invention. Disk 182 is provided with arcuately shaped slots 183 and 185 extending therethrough, see FIG. 8. These slots in the embodiment shown are equal in size and shape to the arcuate slots 172 and 174, although this is not critical. In addition, gasket 186 is also provided with similarly shaped slots 192 and 194, see FIG. 8. In assembled relation the disk 182 and the gaskets 184 and 186 are positioned so that the arcuate slots 183 and 185 in the deflecting plate 182 overlie slots 192 and 194 in gasket 186, and also overlie the arcuate slots 172 and 174 in base 88 to provide open communication between the inlet chamber 92 to groove 176, see FIGS. 4 and 10.

A generally disk-shaped peripheral valve 188 is movably mounted in cylindrical bore 90, see FIGS. 4, 5, 8, 12 and 13. This valve in the particular embodiment shown is provided with an integral stem portion 190 which is slidably movable in bore 96. The stem portion 190 is provided with an O-ring 192 to prevent the passage of water past the stem portion. This arrangement is important because it permits the peripheral valve to be designed with a loose tolerance, yet prevents water from flowing through bore 96 when the peripheral valve permits the flow of water into the chamber 67. Without the O-ring, water would always leak into bore 96 and out the exit passage 200 gradually building up scale, which would eventually jam the valve 188.

Figure 12:
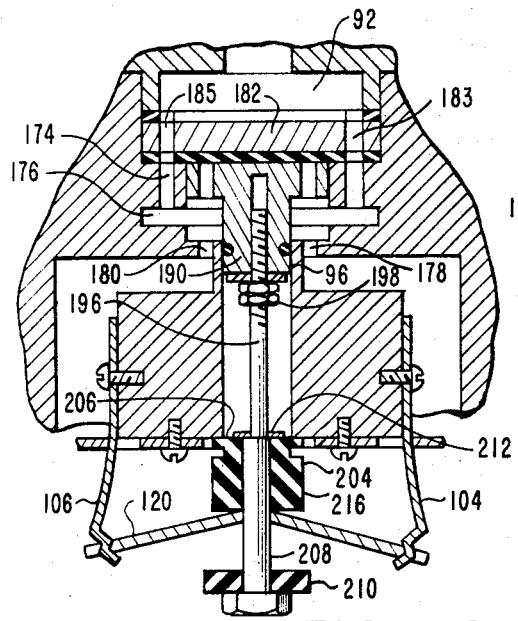
FIG. 12 is an elevational sectional view of the toggle mechanism in the water intake position.
Figure 13:
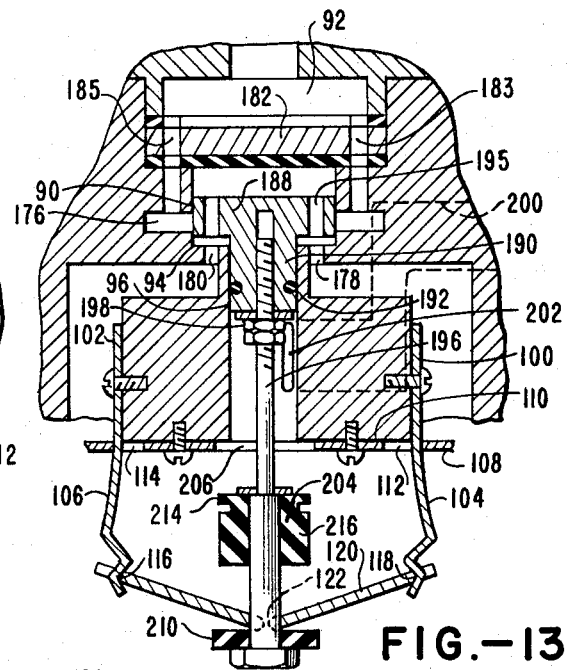
FIG. 13 is an elevational sectional view of the toggle mechanism in the water exhaust position.

Valve 188 is movable between the lower surface of disk 182, see FIG. 12, and the base 94 of bore 90, see FIG. 13. When valve 188 is in the position shown in FIG. 12, water or power fluid under pressure can flow from the groove 176 to arcuate slots 178 and 180 to provide water communication from the inlet fitting 72 to chamber 67. When valve 188 is in the position shown in FIG. 13, the periphery of the disk shaped valve cuts off communication between groove 176 and arcuate slots 178 and 180 and controls thereby the flow of water or power fluid into the power fluid chamber.

The intake end section 64, along with the passages described above, and in particular the saturn-shaped groove 176 surrounding the peripheral valve 188 is designed so the water or power fluid pressure exerted at the inlet fitting 72 is neutralized insofar as its affect on the operation of valve 188 is concerned. This is because the water flow directed toward the valve 188 is entirely circumferential and is directed inwardly. In this way the operation of valve 188 is not appreciably affected by the magnitude of the fluid pressure at the inlet fitting 72.

The valve 188 is also provided with a plurality of bores 195, see FIGS. 8 and 13, so that the water or power fluid can flow freely above and below valve 188. This arrangement prevents water or power fluid from being trapped in the region above valve 188 which would interfere with the operation of the valve. Valve 188 is screwed onto a bolt-like valve rod 196 and in the embodiment shown the valve can be adjusted on the rod by means of lock nuts 198, although it is understood that this feature is not essential to the practice of the invention.

A combined abutment and exit valve 204 is mounted on valve rod 196 for opening and closing the mouth 206 of bore 96 to control communication between the bore 96 and the power fluid chamber 67, see FIGS. 12 and 13. It can be seen by comparing FIGS. 12 and 13 that when valve 188 closes off communication between the saturn-like groove 176 and the arcuate slots 178 and 180, to prevent the entry of fluid into chamber 67 the connection of the valve rod 196 to the exit valve 204 causes the exit valve 204 to move away from the mouth 206 of bore 96 thereby permitting fluid in chamber 67 to leave the housing through the exit passage 200, see FIGS. 4 and 13. Conversly, as seen in FIG. 12, when the disk-shaped peripheral valve 188 permits communication between the saturn-like groove 176 and the arcuate slots 178 and 180, the exit valve 204 has moved into the mouth 206 of bore 96, like a cork in a bottle, to close off the fluid exit passage 200 from the chamber 67.

The valve rod 196 has a portion 208 extending through the exit valve 204 and through the hinge or groove 122 in the spring loaded snap action toggle mechanism 120. Portion 208 of valve rod 196 terminates in a collar-like abutment 210. The collar-like abutment 210 and the combined abutment and exit valve 204 are spaced apart so that the hinge 122 of the toggle mechanism 120 is between these abutments in both of its stable positions. The spacing between abutments 214 and 210 is such that when the snap action toggle mechanism 120 is actuated by the toggle actuators, as described below, the resulting reciprocal movement of the apex or hinge 122 of the toggle mechanism engages in sequence first the combined abutment and exit valve 204 and forces the exit valve up into bore 96 to close it, and then as the operation of the pump continues, the toggle mechanism reverses direction and engages the collar-like abutment 210 to force the combined abutment and exit valve 204 away from its seat on the mouth 206 of bore 96. In this way the reciprocal movement imparted to the snap action toggle mechanism causes the valves 188 and 204 to open and close alternately and periodically.

Figure 16:
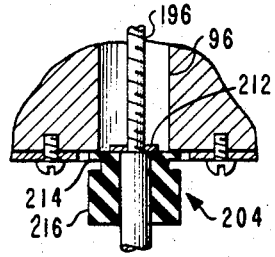
FIG. 16 is an elevational sectional view of the exhaust valve mechanism as it is positioned when the air pump is in the water intake position.
Figure 17:
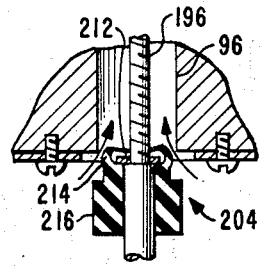
FIG. 17 shows the exhaust valve mechanism of FIG. 16 beginning to open and shows the controlled deformation of the valve.
Figure 18:
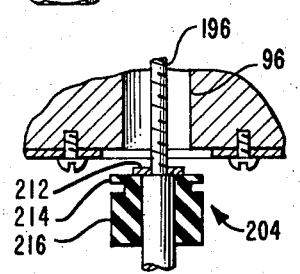
FIG. 18 shows the exhaust valve mechanism in an open position.

The design of the combined exit valve and abutment 204 is important because in order for the pump to work satisfactorily the valve must satisfy a number of requirements. First of all, when the combined abutment and exit valve 204 closes off the mouth 206 of bore 96, there must be no leakage past the valve 204. At the same time, the valve 204 must be designed so it opens and closes easily or else the pump could not operate properly. In this invention the desired characteristics of the combined valve 204 has been provided by constructing the valve 204 with a central disk shaped plate 212 formed from metal or some other rigid material. This plate is sized so it is in close fitting relationship to the walls of bore 96 and so it can slidably move inside that bore, see FIG. 13. The central plate 212 is backed up by an abutting flexible rubber-like disk 214 slightly larger in size than the diameter of bore 96. Below disk 214 is the abutment portion 216 of the valve 204, see FIG. 16. With this arrangement as the valve 204 is unseated and the central plate 212 starts to move out of bore 96, water or power fluid pressure forces the peripheral portions of the disk 214 to curl up around the central plate 212, see FIGS. 16 and 17. This curling movement in effect defines a power fluid or water passage which is inclined at an acute angle to the axis of bore 96 around plate 212, see the arrows in FIG. 17. Since by this arrangement sharp right angle turns in the flow of power fluid around valve 204 is avoided, the resistance of valve 204 to opening and closing is minimized. Once the exit valve 204 becomes completely unseated the disk 214 resumes its normal shape in readiness for the next cycle.

The operation of the pump 60 is generally similar to the operation of the simplified diagram of the pump shown in FIGS. 1 and 2. If water is to be used as the power fluid then the inlet fitting 72 is connected to a faucet or water outlet in a home or building. Then if the internal mechanism of the pump is in the position shown in FIG. 4, water enters the pump body 62 and moves into the water inlet chamber 92. From there the water flows through the arcuate slots 183 and 185, in deflecting disk 182, through slots 172 and 174, in the end body member 64 to the saturn-like groove 176. Since the position shown in FIG. 4 shows the valve 188 is open, the water in groove 176 can flow into bore 90 below valve 188, and from there move through arcuate slots 178 and 180 to the guide channels 124 and 126 and on into the water chamber 67.

Figure 19:
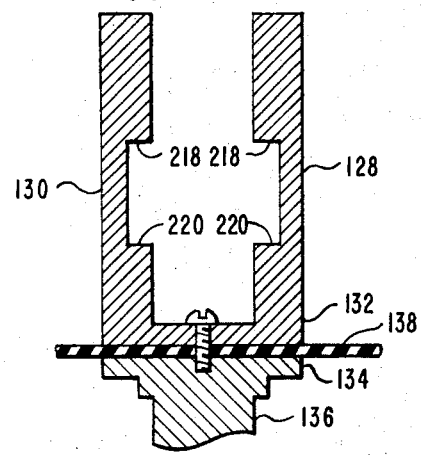
FIG. 19 is an elevated sectional view of the toggle actuators and diaphragm assembly.

As the water chamber 67 fills, it exerts pressure on diaphragm 138 gradually forcing it toward the air or work fluid chamber 150. As the diaphragm 138 moves toward the air chamber 150 it carries the attached toggle actuators 128 and 130 riding in the guide channels 124 and 126, along with it, see FIGS. 19, 20 and 21. As best seen in FIG. 19 the toggle actuators comprise parallel rigid elongated rod-like members having facing flanges 218 and 220 for reasons to be described below.

As the diaphragm 138 moves toward the air chamber 150, the facing flanges 218 and 220 moving with the toggle actuators engage and pull along the facing edges of the toggle mechanism 120. As seen in FIGS. 14 and 15 and as explained above, the toggle mechanism 120 is secured to attached springs 104 and 106 which give it the snap-action. Consequently, after the diaphragm pulls the facing edges of the toggle mechanism with it for a short distance, the toggle mechanism suddenly and abruptly snaps from the position shown in FIGS. 4 and 12 to the position shown in FIGS. 5 and 13. As this happens, the sudden movement of the toggle mechanism engages abutment 210 pulling it and the attached valve stem 196 and the valves 188 and 204 and diaphragm 138 from the position shown in FIGS. 4 and 12 to the position shown in FIGS. 5 and 13 causing the valves 188 and 204 to abruptly change their position. When this happens valve 188 prevents further entry of water from inlet fitting 72 to the water chamber 67, and at the same time valve 204 abruptly moves to open the water exit passage 200 so water then in the water chamber 67 can exit from the pump housing for reasons to be described below.

To this point it should be noted that the forces acting on the diaphragm 138 are balanced regardless of the magnitude of the water pressure, except for the differential pressure across the diaphragm caused by the force exerted by the coil spring 168. This is because the diaphragm 138 deforms as it moves toward the chambers 67 or 150. In particular, when the diaphragm 138 moves toward the chamber 150, the volume of the air chamber decreases, providing thereby a corresponding increase in the pressure of the air chamber 150.

As explained above, when the diaphragm 138 moves into the chamber 150 onto seat 222 in the conical depression 146 it assumes a generally conical shape. Chamber 150 is sized so when this happens practically all the air or work fluid inside chamber 150 is forced out of the chamber through the leaf valve 166 described above.

Figure 21:
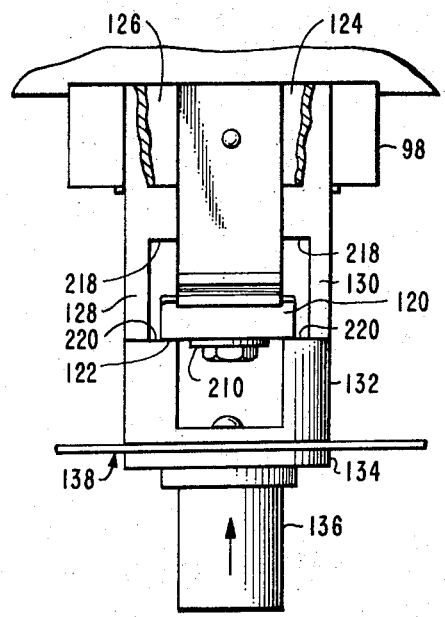
FIG. 21 is the same as the view in FIG. 20 except that the toggle actuators are shown engaging the toggle mechanism in a water exhaust position.

After the flanges 218 on the toggle actuators 128 and 130 move to cause the toggle mechanism to snap to the position shown in FIGS. 5 and 13 and the diaphragm 138 has engaged seat 222 to force almost all the air or work fluid in chamber 150 through the leaf valve 166 into a pressure tank, the facing flanges 220 of the toggle actuators engage the snap action toggle mechanism 120 in preparation for the next part of the cycle, see FIG. 21.

As stated above, the force on the diaphragm 138 is balanced except for the restoring or biasing force exerted by the coil spring 168. Consequently, when the toggle mechanism 120 snaps to the position shown in FIGS. 5 and 13 causing valve 188 to stop the entry of power fluid or water into the pump housing and causing exit valve 204 to unplug or open the power fluid or water exit passage 200, the coil spring which was compressed by the water pressure at the inlet 72 now forces the diaphragm 138 back toward the water or power fluid chamber 67.

As this happens the moving diaphragm causes the toggle actuators to move with it. This diaphragm movement forces a pulse of water or power fluid in the chamber 67 to move out of the body 62 of the pump 60 through the exit passage 200. In addition, the movement of the diaphragm 138 toward the chamber 67 increases the volume of the air chamber 150 so that the pressure in the air chamber drops. This in turn causes leaf valve 164 to open to admit more air or work fluid into the chamber 150. At the same time, the facing flanges 220 of the toggle actuators 128 and 130 carried by the moving diaphragm 138 exerts a force on the snap action toggle mechanism moving it a short distance until the toggle mechanism suddenly snaps back to the position shown in FIGS. 4 and 12, closing off the water exit passage and so that water or the power fluid at the inlet fitting 72 can move back into chamber 67 to repeat the cycle.

Since the differential pressure across the diaphragm 138 is always equal to the spring pressure exerted by the coil spring 168 regardless of the pressure of the water at the inlet fitting 72, each time the diaphragm 138 moves toward the air chamber 150 the pressure of the air or work fluid in the air chamber increases as explained above. When this happens air is vented from the body 62 of the pump through the leaf valve 166 which communicates with a pressure tank. With this arrangement the pressure in the pressure tank can increase until it approaches the pressure of the water at the inlet fitting 72. This is important for reasons to be described below.

As shown in FIG. 4, the diaphragm 138 includes the common base or back-up plate 132 which provides enough hard area so that any possible deformation of the diaphragm will not affect the operation of the pump. Furthermore because the forces exerted on the diaphragm are small in that the differential pressure across the diaphragm is always equal to the pressure exerted by the coil spring 168, the diaphragm can be fairly flexible so that the range of possible materials from which the diaphragm can be made is large and the cost of the diaphragm will be small. Furthermore because the forces across the diaphragm are small the diaphragm will be durable and will have a long life.

The fact that the water powered air pump can only pressurize an air tank until it approaches the pressure of the water at the inlet fitting 72, and thereupon ceases operation provides an unexpected benefit in that it permits the pump to operate automatically and intermittently without the use of auxiliary regulatory valves or indicators of any kind at the inlet fitting 72.

In particular if the water inlet 72 is connected to a faucet or water outlet in a building, and the threaded bore 170 is connected to a pressurized tank, and if the water faucet is turned on permitting water to flow into the pump housing, the pump will operate until the pressure in the pressurized tank approaches the line pressure of the water at the water inlet fitting 72. When this happens the pump will automatically stop.

Thereafter if the pressurized air in the tank is used up or escapes due to a leaking fitting, as soon as the pressure in the pressurized tank drops a predetermined amount the pump will automatically resume operation. In other words, the pump may be described as sensing the pressure in the pressurized tank, and without the use of any special valves or regulators, and operating so when the pressure in the pressure tank is low, the pump automatically resumes operation until the pressure in the pressurized tank again rises to near the magnitude of the water pressure at the water inlet fitting 72. Thereupon the pump again automatically ceases operation.

It is apparent that this pump lends itself to a variety of uses. The separation between the air or fluid under pressure which is used to drive the pump and the gas or liquid being pumped suggests that this pump could be used to pump dangerous or corrosive materials, or radioactive substances. Furthermore, the natural reciprocating movement of the pressure balanced diaphragm suggests that this pump might be useful as a water powered artificial heart in situations where it is desirable that the pump operation not be vulnerable to power failure or mechanical defects. Further, the pump could also serve to drive a refrigerator by pressurizing the refrigerator in places where water pressure is available and where it is desired to use the exhaust water for other purposes, such as drinking, or even watering a lawn. In such a use it would be apparent that a heat actuated valve would be installed at the inlet fitting 72 which would open to admit water to pump when the temperature in the refrigerator rises, and which would close when the temperature in the refrigerator falls to a desired level. In addition, the pump would be useful in the meat packing industry which has a requirement bath for large quantities of air under pressure and for water, because the quality of the water is not affected by passing through the pump.

Obviously many modifications and variations of the present invention are possible in the light of the above teachings. It is therefore to be understood that within the scope of the appended claims the invention can be practiced otherwise than as specifically described.

What is claimed is:

1. A transducer of the class described comprising in combination a housing, a diaphragm in said housing dividing said housing into a power fluid chamber and a work fluid chamber, said diaphragm mounted for reciprocal movement toward and away from said work fluid chamber, said power fluid chamber having a first inlet to permit power fluid under pressure to enter said power fluid chamber, a first outlet in said power fluid chamber to permit power fluid in said power fluid chamber to leave the housing, alternate action closure means in said housing for preventing the flow of power fluid into said housing when said first outlet is open and for permitting the flow of power fluid into said housing when said first outlet is closed, said diaphragm mounted in said housing in such a way that when said power fluid enters said power fluid chamber the pressure of said power fluid deforms the diaphragm and forces it toward the work fluid chamber thereby increasing the pressure in the work fluid chamber, biasing means connected to said diaphragm to bias said diaphragm toward said power fluid chamber whereby the differential pressure across the diaphragm is always equal to the pressure exerted by said biasing means independently of the pressure of the power fluid, means connecting said alternate action closure means to said diaphragm in such a way that when the power fluid under pressure enters the power fluid chamber and the diaphragm is forced toward the work fluid chamber the alternate action closure means prevents the further entry of power fluid in said housing and opens said first outlet, a second inlet and a second outlet in said work fluid chamber each closed off by pressure actuated valves whereby when said diaphragm moves toward said work fluid chamber the valves operate in such a way that the second inlet closes and said second outlet opens causing work fluid to be forced through said second outlet, and so that thereafter when said biasing means forces said diaphragm back toward said power fluid chamber the valves in said work fluid chamber to operate to open said second inlet to admit additional work fluid and to close said second outlet, while said power fluid in said power fluid chamber exits through said first outlet, said movement of the diaphragm toward said power fluid chamber actuating said means connecting said alternate action closure means to said diaphragm in such a way that additional power fluid can then enter said housing while said first outlet is closed to repeat the cycle.

2. The transducer described in claim 1 wherein said means connecting said alternate action closure means to said diaphragm is a reciprocal snap action mechanism movable between two stable positions whereby as the diaphragm is forced toward the work fluid chamber said snap action mechanism moves from one stable position to another and abruptly stops the flow of power fluid into said housing and opens said first outlet, while said diaphragm is abruptly forced toward said work fluid chamber thereby forcing the work fluid in said work fluid chamber through said second outlet, and when said biasing means forces said diaphragm back toward said power fluid chamber said snap action mechanism reverts back to its first stable position and abruptly forces the diaphragm toward said power fluid chamber to abruptly close off said first outlet and permit the further entry of power fluid into said housing, and the decrease in pressure in said work fluid chamber caused by this last movement of the diaphragm causes the pressure actuated valves in said work fluid chamber to admit additional work fluid into said work fluid chamber.

3. The transducer described in claim 2 wherein when said second outlet is connected to a fluid pressure tank and said first outlet is connected to a source of power fluid under pressure, the diaphragm and the reciprocal snap action mechanism operate continuously first drawing work fluid into the work fluid chamber and then forcing it out of the work fluid chamber to the fluid pressure tank, until the pressure in the fluid pressure tank approaches the pressure of the power fluid entering the housing, whereupon all movement of the diaphragm and the reciprocal snap action mechanism automatically ceases and the movement automatically starts again whenever the pressure in the pressure tank falls to a predetermined level below the pressure of the power fluid entering the housing.

4. The transducer described in claim 2 wherein said alternate action closure means comprises a first valve operating to control the flow of power fluid into said power fluid chamber and a second valve operating to open and close said first outlet, said first and second valves mechanically connected together so that when said first valve permits power fluid to enter the power fluid chamber said second valve is closed and when the second valve is open the first valve stops the entry of power fluid into the power fluid chamber, and wherein said reciprocal snap action mechanism comprises a snap action toggle, said toggle connected to said first and second valves, a toggle actuator movable with said diaphragm and connected to said snap action toggle whereby when the power fluid enters the power fluid chamber and exerts pressure on the diaphragm causing it to move a short distance toward the work fluid chamber, the toggle actuator exerts a force on the snap action toggle causing it to move abruptly from one stable position to another so that the first valve abruptly moves to permit the entry of power fluid into the power fluid chamber while said second valve simultaneously closes, and when the biasing means moves the diaphragm a short distance toward the power fluid chamber the toggle actuator exerts an opposite force on the snap action toggle causing it to move abruptly back to its original stable position whereby said first valve abruptly moves to stop the entry of power fluid into the power fluid chamber and the second valve simultaneously closes the first outlet.

5. The transducer described in claim 4 wherein said first valve functions substantially independently of the pressure of the power fluid.

6. The transducer described in claim 4 wherein said housing includes at least two opposed power fluid inlet passages, said first valve positioned between said two opposed power fluid inlet passages whereby power fluid entering first inlet is divided and flows through said power fluid passages toward each other to engage the opposite sides of said first valve whereby the pressure of said power fluid on said first valve is neutralized so that the first valve functions substantially independently of the pressure of the power fluid.

7. The transducer described in claim 4 wherein said housing includes a power fluid inlet chamber, a bore in said housing communicating with said power fluid chamber, said first valve similar in cross section to the cross section of the bore and movable in said bore, a groove in said housing concentric with said bore and communicating with said bore and said power fluid inlet chamber, said first valve movable in said bore so that in one position power fluid can flow from said power fluid inlet chamber to said groove and through said bore to said power fluid chamber, and in another position the periphery of said first valve closes off the communication of said groove with said bore so that power fluid entering said power fluid inlet chamber and flowing to said groove engages the periphery of said first valve whereby the pressure of the power fluid on said first valve is neutralized so that said first valve functions substantially independently of the pressure of the power fluid and the flow of power fluid to said power fluid chamber is cut off.

8. The transducer described in claim 7 wherein said first outlet communicates with said bore, a rod connecting said first valve and said second valve together, said second valve operating to open and cut off the communication of said bore with said power fluid chamber.

9. The transducer described in claim 8 wherein at least part of said bore is circular in cross section and has an entrance at the power fluid chamber, a central rigid disk connected with said rod and movable in said bore concentric with and near the walls of the bore, a rubber-like disk slightly larger than the diameter of said bore concentric with and abutting against said rigid disk, said rubber-like disk overlying the entrance of said bore to said power fluid chamber, said rigid disk movable into and out of the entrance of said bore with said power fluid chamber and operating with said rubber-like disk to plug the entrance of said bore when said first valve is in said first position, and when said first valve moves to said other position, as said rigid disk moves out of said bore said rubber-like disk deforms around the periphery of said rigid disk to channel the power fluid around said rigid disk at the entrance of said bore, so it enters the bore at an acute angle to the axis of said bore whereby the resistance of said second valve to movement into and out of said bore is decreased.

10. The transducer described in claim 7 wherein when said second outlet is connected to a fluid pressure tank and said first outlet is connected to a source of power fluid under pressure, the movably mounted diaphragm and the reciprocal snap action mechanism operate continuously first drawing work fluid into the work fluid chamber and then forcing it out of the work fluid chamber to the fluid pressure tank until the pressure in the fluid pressure tank approaches the pressure of the power fluid entering the housing whereupon all movement of the diaphragm and the reciprocal snap action mechanism automatically ceases and the movement automatically starts again whenever the pressure in the pressure tank falls to a predetermined level below the pressure of the power fluid, without the use of auxiliary or pressure indicating devices.

11. A water pressure powered air pump comprising a housing, a water inlet in said housing for permitting water under pressure to enter said housing, a water outlet in said housing to permit water in said housing to exit the housing, alternate action first and second pressure balanced valves in said housing operating to close the water outlet when the water inlet is open and to close the water inlet when the water outlet is open whereby said alternate action pressure balanced valves function independently of the pressure of the water and can operate with low actuation forces, a water pressure responsive motion transmitting mechanism mounted in said housing and movable in response to pressure changes in said housing caused by the entrance of water under pressure entering the housing and by water exiting the housing through the water outlet; an air chamber, an air inlet valve and an air outlet valve in said air chamber, said water pressure responsive motion transmitting mechanism operatively associated with said air chamber in such a way the movement of said water pressure responsive motion transmitting mechanism in one direction causes said air inlet valve to open to admit air into said air chamber while said air outlet valve closes, and said movement in the opposite direction causes said air inlet valve to close while said air outlet valve opens so that air in the air chamber may be forced out of the air chamber by the movement of said water pressure responsive motion transmitting mechanism.

12. The air pump described in claim 11 wherein at least part of said second valve is formed from an elastomeric material whereby said second valve can deform to conform to pressure differences across the valve to achieve self adjusting pressure balanced valve action.

13. In a transducer of the class described, a housing, a first peripheral disk shaped valve mounted in said housing, a second valve in said housing, a rod connecting said first and second valves together, said second valve comprising a rigid disk shaped plate, a flexible rubber-like disk concentric with said plate and slightly larger in diameter, one surface of said rubber-like disk abutting against an adjacent surface of said rigid disk plate, the opposite surface of said rubber-like disk abutting against a concentric cylindrical first abutment, said rod extending through said second valve and first abutment and terminating in a second abutment, a spring loaded hinged snap action toggle plate movable between a first and second stable position, the hinge of said toggle plate movable between said first and second abutments and adapted to engage said abutments in sequence to cause said first and second valves to have a reciprocal movement, a diaphragm mounted in said housing for reciprocal movement, a toggle actuator mounted on and movable with said diaphragm, said toggle actuator connected to said snap action toggle plate in such a way that the reciprocal movement of the diaphragm causes said hinged snap action toggle plate to move in sequence from one stable position to another so that said first and second valves have a reciprocal movement when said diaphragm has a reciprocal movement.

14. A transducer of the class described comprising in combination a housing, pressure responsive means mounted in said housing for reciprocal movement and for dividing said housing into two portions, the first of said portions adapted to receive a power fluid, the second of said portions adapted to receive a work fluid, a first inlet in said housing adapted to admit power fluid under pressure into said first portion, a first outlet in said housing adapted to permit the power fluid in said first portion to exit said housing, alternate action closure means in said housing for preventing the flow of power fluid into said housing through said first inlet when said first outlet is open and for closing said first outlet when power fluid can flow into said housing through said first inlet, said alternate action means including first and second pressure balanced valves whereby said valves function independently of the pressure of the power fluid and operate with low actuation forces, said alternate action closure means connected to said housing in such a way that when said pressure responsive means moves in one direction said alternate action closure means prevents the flow of power fluid into said housing through said first inlet and opens said first outlet and when said pressure responsive means moves in the opposite direction the laternate action closure means permits the flow of power fluid through said first inlet and closes said first outlet, a second inlet and a second outlet in said second portion and in operative association with said pressure responsive means so that when said pressure responsive means moves in said one direction said second outlet opens to permit the exit of said work fluid from said housing while said second inlet closes to stop the entry of said work fluid into said second portion, and when said pressure responsive means moves in the opposite direction said second outlet closes and said second inlet opens to permit the entry of work fluid into said second portions.

15. The transducer described in claim 14 wherein at least part of said second valve is formed from an elastomeric material whereby said second valve can deform to conform to pressure differences across the valve to achieve self adjusting pressure balanced valve action.

16. A transducer of the class described comprising in combination a housing, pressure responsive means mounted in said housing for reciprocal movement and for dividing said housing into two portions, the first of said portions adapted to receive a power fluid, the second of said portions adapted to receive a work fluid, a first inlet in said housing adapted to admit power fluid under pressure into said first portion, a first outlet in said housing adapted to permit power fluid in said first portion to exit said housing, alternate action closure means in said housing for preventing the flow of power fluid into said housing through said first inlet when said first outlet is open and for closing said first outlet when power fluid can flow into said housing through said first inlet, said alternate action closure means connected to said housing in such a way that when said pressure responsive means moves in one direction said alternate action closure means prevents the flow of power fluid into said housing through said first inlet and opens said first outlet, and when said pressure responsive means moves in the opposite direction the alternate action closure means permits the flow of power fluid through said first inlet and closes said first outlet, a second inlet and a second outlet in said second portion and in operative association with said pressure responsive means so that when said pressure responsive means moves in said one direction said second outlet opens to permit the exit of said work fluid from said housing while said second inlet closes to stop the entry of said work fluid into said second portion, and when said pressure responsive means moves in the opposite direction said second outlet closes and said second inlet opens to permit the entry of work fluid into said second portion, said alternate action closure means in said housing comprising a first valve for controlling the flow of power fluid into said first portion of the housing, a second valve for opening and closing said first outlet, said first and second valves connected together, said housing including at least two opposed power fluid inlet passages whereby power fluid entering said first inlet is divided and flows through said power fluid passages to engage the opposite sides of said first valve whereby the pressure of the power fluid on the first valve is neutralized so that said first valve functions substantially independently of the pressure of the power fluid.

17. The transducer described in claim 16 wherein said second valve is formed at least in part from a flexible resilient material and functions as a plug for said first outlet, the flexible material of said second valve shaped so that as said second valve moves to unplug said first outlet, the flexible material deforms in such a way as to channel the power fluid around said second valve into said outlet in a direction which minimizes the resistance of said second valve to opening.

18. A transducer of the class described comprising in combination a housing, pressure responsive means mounted in said housing for reciprocal movement and for dividing said housing into two portions, the first of said portions adapted to receive a power fluid, the second of said portions adapted to receive a work fluid, a first inlet in said housing adapted to admit power fluid under pressure into said first portion, a first outlet in said housing adapted to permit the power fluid in said first portion to exit said housing, alternate action closure means in said housing for preventing the flow of power fluid into said housing through said first inlet when said first outlet is open and for closing said first outlet when said power fluid can flow into said housing through said first inlet, said alternate action closure means connected to said housing in such a way that when said pressure responsive means moves in one direction said alternate action closure means prevents the flow of power fluid into said housing through said first inlet and opens said first outlet, and when said pressure responsive means moves in the opposite direction, the alternate action closure means permits the flow of power fluid through said first inlet and closes said first outlet, a second inlet and a second outlet in said second portion and in operative association with said pressure responsive means so that when said pressure responsive means moves in said one direction said second outlet opens to permit the exit of said work fluid from said housing while said second inlet closes to stop the entry of said work fluid into said second portion, and when said pressure responsive means moves in the opposite direction, said second outlet closes and said second inlet opens to permit the entry of work fluid into said second portion, said first portion of said housing including a power fluid inlet chamber and a power fluid chamber, a bore in said housing communicating with said power fluid chamber, a first valve for controlling the flow of power fluid into said first portion of the housing, a second valve for opening and closing said first outlet, said first and second valves connected together, said first valve similar in cross section to the cross section of the bore and movable in said bore, a groove in said housing concentric with said bore and communicating with said bore and said power fluid inlet chamber, said first valve movable in said bore so that in one position power fluid can flow through said power fluid inlet chamber to said groove and through said bore to said power fluid chamber, and in another position, the periphery of said first valve closes off the communication of said groove with said bore so that power fluid entering said power fluid inlet chamber and flowing to said groove engages and is stopped by the periphery of said first valve; whereby the pressure of the power fluid on said first valve is neutralized so that said first valve functions substantially independently of the pressure of the power fluid and the flow of power fluid to said power fluid chamber is cut off.

19. A transducer of the class described comprising in combination a housing, pressure responsive means mounted in said housing for reciprocal movement and for dividing said housing into two chambers, the first of said chambers adapted to receive a power fluid, the second of said chambers adapted to receive a work fluid, a first inlet on said housing adapted to admit the power fluid under pressure into said first chamber, a first outlet in said housing adapted to permit the power fluid in said first chamber to leave the housing, snap action alternate action closure means in said housing for abruptly stopping the entry of power fluid into said first chamber when said first outlet is open and for abruptly closing said first outlet when said first inlet permits the entry of power fluid into said first chamber, said snap action alternate action closure means connected to said housing in such a way that when said pressure responsive means moves a short distance in one direction, said snap action alternate action closure means abruptly stops the entry of power fluid into said first chamber while simultaneously opening said first outlet and when said pressure responsive means moves a short distance in the opposite direction, the snap action alternate action closure means permits the entry of power fluid into said first chamber while simultaneously closing said first outlet, a second inlet and a second outlet in said second chamber, each closed off by pressure actuated valves, said valves in operative association with said pressure responsive means so that when said pressure responsive means moves in said one direction, the valve covering said second outlet opens to permit the exit of the work fluid from said second chamber while said second inlet is closed, and when said pressure responsive means moves in the opposite direction the second outlet is closed while the valve covering said second inlet opens to permit additional work fluid to enter into said second chamber, said snap action alternate action closure means comprising a first valve operating to control the entry of power fluid into said first chamber; a second valve operating to open and close said first outlet, said first and second valves mechanically connected together so that when said first valve is open the second valve is closed and when the second valve is open the first valve is closed, a snap action toggle mechanism connected to said first and second valves and movable between a first and second stable position, a toggle actuator connected between said snap action toggle mechanism and said pressure responsive means whereby when the power fluid enters the first chamber and exerts pressure on the pressure responsive means causing it to move a short distance in one direction, the toggle mechanism moves abruptly from one stable position to another so that the first valve moves abruptly to stop the entry of power fluid into said first chamber while said second valve simultaneously opens, and when the pressure responsive means moves a short distance in the opposite direction the toggle actuators exert an opposite force on the toggle mechanism causing it to move abruptly back to the original stable position whereby the first valve abruptly moves to permit the entry of power fluid into said first chamber and the second valve simultaneously closes the first outlet.

20. The transducer described in claim 19 wherein said second valve functions like a plug and is constructed in part from flexible deformable material, said second valve constructed so that as said second valve starts to open said first outlet the flexible material comprising said second valve deforms in such a way as to channel the power fluid around the valve in a direction which decreases the resistance of the said second valve to opening.

21. A self adjusting pressure balanced valve for closing off a bore in a housing in a pressurized fluid system comprising a valve rod, a rigid plate similar in cross section to the cross section of the bore in close fitting relationship to the walls of the bore rigidly secured to the valve rod and slidable moveable inside said bore, said plate having an elastomeric backing generally similar to the shape of the plate and slightly larger than the bore whereby said elastomeric backing is supported by said plate so that if pressure forces acting inside said bore exert force on said valve, this force is substantially balanced by the pressure forces on the other side of the valve in the pressurized fluid system acting on said rigid plate, and to the extent said pressure forces are slightly unbalanced, the said unbalanced pressure causes the elastomeric material to deform in a self adjusting action until the increased tension in said elastomeric material when added to the pressure forces acting on said rigid plate from pressure forces on the other side of said valve exactly balances the pressure forces inside the bore.

22. The self adjusting pressure balanced valve described in claim 21 wherein said elastomeric material is constructed so as the valve starts to open said elastomeric material deforms in such a way as to channel power fluid around the valve in a direction which decreases the resistance of the valve to opening.

References Cited

UNITED STATES PATENTS

| | | | |
|---|---|---|---|
| 2,578,050 | 12/1951 | Deters | 230—52 |
| 2,652,973 | 9/1953 | Dibble et al. | 230—52 |
| 2,698,710 | 1/1955 | Pedroia | 103—6 XR |
| 2,863,600 | 12/1958 | Pedroia et al. | 103—6 XR |

ROBERT M. WALKER, *Primary Examiner.*